March 1, 1960
V. A. GILL
2,926,934
COUPLING
Filed Aug. 27, 1956
2 Sheets-Sheet 1
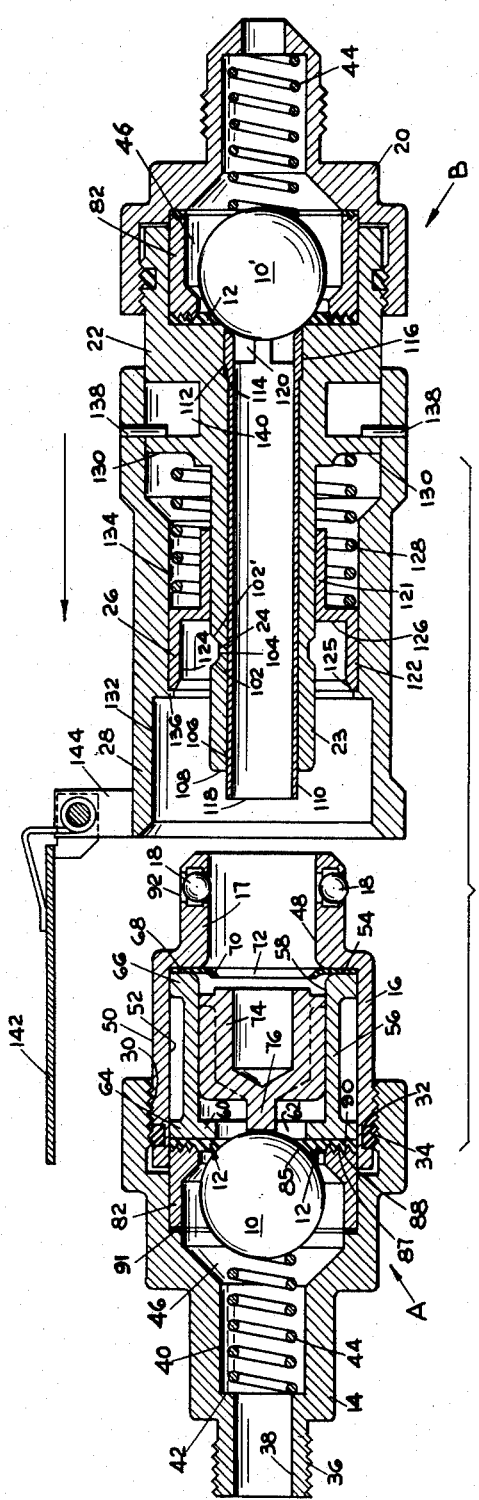
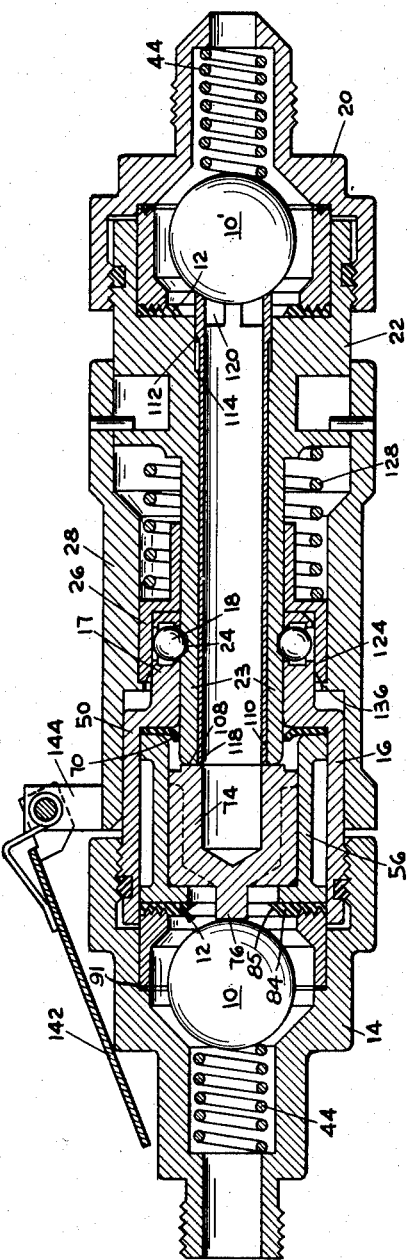
INVENTOR.
VINCENT A. GILL
BY
Harry S. Shapiro
ATTORNEY INVENTOR.
VINCENT A. GILL
BY
Harry G. Shapiro
ATTORNEY

United States Patent Office 2,926,934
Patented Mar. 1, 1960

2,926,934

COUPLING

Vincent A. Gill, Montclair, N.J., assignor, by mesne assignments, to The Weatherhead Company, Cleveland, Ohio, a corporation of Ohio Application August 27, 1956, Serial No. 606,283

8 Claims. (Cl. 284—18)

The invention relates to couplings, and is more particularly directed to improvements in couplings of the type which may be manually, and without tools, quickly and readily connected and disconnected.

An object of the invention is to provide a coupling structure of improved construction having a radially moveable ball detent on one coupling member which cooperates with a locking groove on the other member, and a spring loaded locking sleeve wherein the detent is retained in its coupling member in a manner which permits elimination of the usual overlying detent ball retaining sleeve or other detent retaining element. Besides eliminating an element, a smaller diameter is permitted with the resultant saving of space.

A feature of the preferred form of the invention is the provision of means for securing a ball detent or clutch element within a wall so that the wall itself, without any additional holding member will retain the ball detent, while permitting the detent to move toward either one side of the wall or the other.

A further feature of the invention is that (to provide a coupling of the type under consideration which will permit) the coupling members may be connected regardless of the manner in which the coupling members are held during the act of coupling. With one coupling member held stationary or moved toward the other, the other coupling member may be grasped by the end fitting, or the hose connected thereto, or by the forward end of the coupling member, the only requirement being that there be relative movement of the coupling members toward each other in an axial direction.

In its more specific aspects, the present invention is directed to a valved coupling structure suitable for conducting therethrough liquid or gaseous oxygen. A valve is provided in each coupling member, the valves being closed when the coupling members are disconnected and opened responsive to the act of coupling. Thus, a further object of the invention is to provide an improved seal between adjacent metal parts which will withstand, without leakage, a wide range of temperature conditions, approximately −300° F. to 175° F., such as encountered in conducting either liquid or gaseous oxygen through the coupling.

These, and other objects, advantages and results will be apparent from the following detailed description, taken in conjunction with the drawings, in which:

Fig. 1 is a longitudinal cross-sectional view of valved coupling members made in accordance with the invention, the members being disconnected and the valves in closed condition;

Fig. 2 is similarly a longitudinal cross-sectional view of the coupling members, this view showing the members in their connected and locked position, with the valve in each coupling member open;

Figure 3:
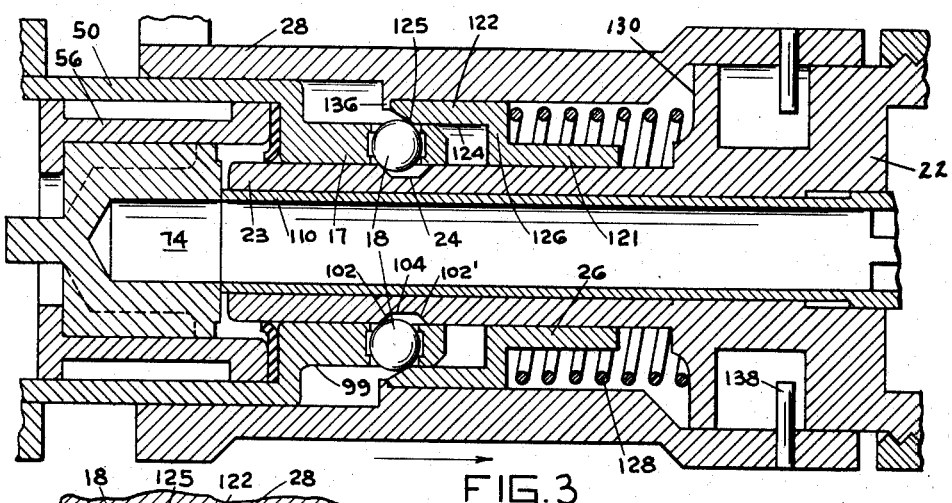
Fig. 3 is a partial longitudinal cross-sectional view showing the coupled and locked members of Fig. 2 being disconnected from each other.

Referring to Figs. 1 and 2, the coupling of the present invention generally comprises a pair of coupling members A and B, the member A for convenience being termed the socket member, and the member B, the plug or nipple member. The members A and B may each be provided with identical ball or check valves 10 and 10′, respectively, each valve being normally resiliently urged or biased in an axial direction to closed position against a seat 12.

The coupling member A comprises an end fitting 14 secured to a socket body 16. The valve 10 is mounted within the body and fitting assembly for movement in an axial direction away from and back to its seat 12. The body is formed with a front socket portion 17, the wall of which is provided with equidistantly spaced, radially extending apertures within which are secured ball detents 18 for movement to the inner and outer faces of the wall. The manner in which the ball detents are secured within the wall will be subsequently described.

The coupling member B comprises an end fitting 20 to which is secured a plug or nipple body 22. The valve 10′ is mounted within the body and fitting assembly for movement in an axial direction away from and back to its seat 12. The body is formed with an axially extending plug portion 23 adapted to be received with a close sliding fit within the socket portion 17. An annular locking groove 24 is formed in the periphery of the plug portion. Spring-pressed locking means 26 is slideably mounted on the plug portion of the body for cooperation with the ball detents 18 and the locking groove 24 in a manner to be subsequently described.

The parts are dimensioned so that when the disconnected coupling members as shown in Fig. 1 are pushed together in an axial direction, the members A and B are strongly connected and locked to each other, with the valves 10 and 10′ moved back from their respective seats to allow the passage of fluid or gas through the coupling, as shown in Fig. 2. Unlocking means 28 is provided for cooperation with the locking means 26 to permit the coupled members of Fig. 2 to be disconnected from each other, as shown in Fig. 3. The cooperative relationship of the unlocking means and the locking means will be subsequently described.

In greater detail, and referring to Fig. 1 for a preferred embodiment of the invention, the body 16 is externally threaded at 30 for engagement with the internally threaded end fitting 14. The body is provided with an annular groove 32 within which is disposed a deformable thread locking and sealing ring 34 formed of a suitable material, such as nylon. The end fitting is externally threaded at 36 for suitable connection to a hose or pipe, and is provided with a bore 38 for communication with same. The end fitting is formed with a counterbore 40 of a diameter larger than the diameter of the bore 38 to provide a shoulder 42. The shoulder serves as a bearing for one end of a spring 44, the other end of the spring bearing against the ball check valve 10. The fitting is provided with a bore or chamber 46 of increased diameter to accommodate the valve.

The body 16 is formed with the forward socket portion 17 having an internal bore 48, and a rear portion 50 of larger diameter providing a counterbore 52 of a larger internal diameter than the bore 48, thereby providing an internal radially extending shoulder 54. Within the bore 52 a hollow, spool-like valve seat retainer 56 is disposed with a close sliding fit. The valve seat retainer is provided with a bore 58, terminating in an end wall 60 at the valve end in which is formed a central, axially arranged aperture 62. An outwardly extending, circumferential flange 64 is provided to fill out the bore 52, and a similar flange 66 is provided at the opposite end of the valve seat retainer. Intermediate the flange 66 and the shoulder 54, an apertured sealing washer 68 is pressed. The sealing washer is formed with an inwardly curved lip 70 surrounding its central aperture 72. The aperture is of a size to furnish a close friction seal around the periphery of the plug portion 23. The sealing washer may be formed of any suitable plastic material which will retain its resiliency over a wide range of temperature, examples of such materials being Mylar, which is understood to be a polyester composition, or Kel–F, a fluorinated and chlorinated polyethylene, the chemical composition of which is understood to be trifluoromonochloropolyethylene. The former material is preferred. A filter member 74 is disposed within the bore 58 of the valve seat retainer. The filter is first inserted into the valve seat retainer and the assembly placed into the body 16 from its wide end. The diameter of the filter is greater than the diameter of the opening in the body leading into the bore 48 so that the filter cannot fall out of the socket end of the body.

Figure 8:
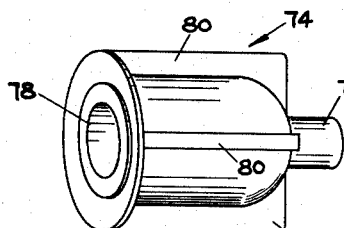
Fig. 8 is a perspective view of a filter member which may be positioned in the bore of one of the coupling members.

As more particularly shown in Fig. 8, the filter 74 is a cup-like piece having a stem or stud 76 extending from its closed end for engagement with the valve 10 through the aperture 62 in the valve seat member. The filter is made of sintered Oilite to provide pore openings of a size which will remove particles which are larger than 25 microns. The porous material is shaped or molded around a central hollow core support 78 which provides the aforementioned stud 76. Spaced fins 80 extend from the sides of the member to strengthen the piece and fill out the bore 58 with a close sliding fit.

To provide an improved valve seat, together with a seal which will prevent leakage of gas or fluid between metal surfaces over a wide range of temperatures, the valve seat 12 is pressed between the valve seat retainer 56 and a valve seat spacer 82. The valve seat and sealing member 12 comprises an annular, centrally apertured, thin washer-like element having a thickened valve seat portion 84 arcuately shaped at 85 for mating engagement with the spherical contour of the valve 10. This element is formed of a flexible, deformable plastic material which will withstand a wide temperature range without becoming unduly brittle at low temperatures, approximately minus 300° F. or flow unduly when subjected to high temperatures, approximately 175° F. Materials which will satisfy these requirements are Kel–F or Mylar, the former being preferred.

In order to provide a gas and fluid tight seal between the metal faces of the valve seat retainer 56 and the valve seat spacer 82, one of such metal surfaces is contoured to form or mold a series of spaced, concentric sealing rings into the thin flat portion of the plastic seat and seal member. This is accomplished by forming one of the metal surfaces, which in the form of the invention illustrated is the forward face, designated 86, of the valve seat spacer 82 (Fig. 9), with a series of concentric, spaced projections or ridges 87, and adjacent grooves 88. The projections are sufficiently sharp to bite into the thin flat portion of the plastic element when pressure is applied, as by threading the body 16 into the end fitting 14 with the described parts assembled therein. By suitable dimensioning of the thickness of the flat portion and of the depth or height of the projections, a series of substantially individually spaced, concentrically arranged sealing rings of the plastic material are formed within the spaced grooves 88, leaving a thin, continuous base 90 against the unserrated face of the valve seat retainer. If desired, the thickness of the plastic material and the depth of the grooves may be dimensioned so that the tips of the projections may be pressed into metal to metal contact with the flat face of the valve seat retainer, thereby forming a series of separately spaced, concentric sealing rings of the plastic material. A sealing washer 91, preferably of aluminum foil, is disposed between the end of the valve seat spacer and an adjoining internal shoulder formed in the end fitting.

Figure 6:
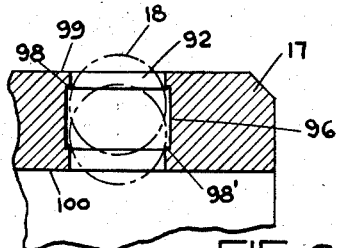
Fig. 6 is a fragmentary, enlarged view showing a preferred structure of a body wall for securing a ball detent in a manner permitting movement of the ball in a radial direction toward either side of the wall.
Figures 7, 9:
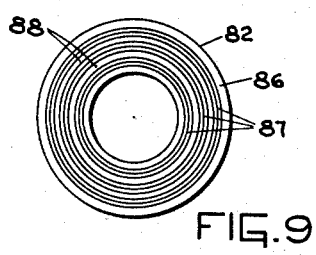
Fig. 7 is a perpective view of a tool which may be used to form the body wall structure shown in Fig. 6.
Fig. 9 is an end view of a preferred form of valve seat retainer constructed to additionally provide a seal which will prevent leakage between adjacent metal surfaces throughout a wide temperature range.

In the preferred and illustrated form of the invention, the ball detents 18 are each held in the wall of the socket portion 17 without resort to any space-consuming, auxiliary holding means; the wall itself is formed to prevent escape of the radially moveable ball. As shown in Fig. 6, this is accomplished by forming a radially extending opening 92 in the wall of a diameter slightly less, by two or three thousandths, than the diameter of the ball detent 18. The diameter of the ball is greater than the thickness of the wall. With the body 16 held in a suitable fixture, a tool T such as shown in Fig. 7, having a width at its outwardly stepped cutting edge 94 less than the diameter of the opening 92, is disposed in the opening. The tool is rotated about its longitudinal axis and the body is moved laterally, or the body is held fixed and the tool moved laterally, to form a transverse groove 96 in the wall. The diameter of the groove transverse to the axis of the aperture 92 is made greater by several thousandths than the diameter of the ball detent, thereby providing two radially spaced shoulders or undercuts 98 and 98', each of which extends transversely around the diameter of the aperture. The ball detent is then forcibly pressed into the undersize opening 92 until the ball is forced beyond one of the undercuts. Thus, the ends of the bore forming the aperture are shaped or formed, so that the reduced diameter acts as a stop to prevent the ball from escaping, while permitting the ball to "float" or move in a radial direction, allowing a segment of the ball to extend either beyond the outer surface 99 or the inner surface 100 of the wall. By using a cutting tool which is convexly contoured as at 97 and concavely shaped at 97', sharply defined shoulders 98 and 98' are certain to be obtained.

An example of the relative dimensions which may be used to accomplish the foregoing is to form the undersize aperture 92 of a diameter of 0.154 inch in a wall having a thickness of 0.120 inch. The groove 96 is made to a height, or in the direction of the thickness of the wall, of 0.077 inch, and a diameter of 0.158 inch. A ball 0.156 inch in diameter when forced through the specified smaller opening is securely held against removal by the undercuts 98 and 98'. A segment height of 0.036 inch of the sphere will extend beyond one face of the wall when the opposite end of the ball is co-extensive with the opposite wall.

In the coupling member B, the end fitting 20 is similarly externally threaded for engagement with a hose or pipe and internally threaded for engagement with the externally threaded body 22. The end fitting and body are provided with a plastic locking ring at their threaded connection. The valve 10' is similarly biased against a valve seat which is retained in position between a valve seat spacer and a smooth metal face, supplied in the illustrated form of the invention, by an internal shoulder provided by the body 22, as previously described. Like elements are therefore indicated by like reference numerals.

The plug portion 23 of the body 22 is provided with the annular locking groove 24. The groove is formed with inwardly inclined or converging faces 102 and 102' terminating in a flat base 104. The plug portion has an internal bore 106 which extends from its forward edge 108 through, and in connection with, the enlarged bore or chamber 46 formed within the end fitting 20. A hollow shaft-like insert 110 is disposed within the bore 106. The insert is provided with a thickened section to furnish a shoulder 112 for cooperaton with a dependent annular shoulder 114 formed by a slightly larger counterbore than the bore 106 in the hollow plug portion 23. The insert is formed at the end thereof adjacent the valve 10' with two or more studs or projections 116 equidistantly spaced around its circumference, the studs being champfered or beveled for mating engagement with the valve 10'. The length of the shaft-like insert 110 is such that when the valve 10' is closed and biased against its seat, the shaft insert is also biased forward by the same spring 44 so that the forward edge of the insert, designated 118, extends beyond the edge 108 of the hollow plug portion 23 of the body. In this condition the shoulders 112 and 114 abut each other, as shown in Fig. 1. When the valve 10' is retracted against the pressure exerted by its spring, the spaces between the projections 116 provide ports 120 for passage of the fluid or gas around the check valve and through the end fitting.

To lockably connect the coupling members, and for cooperation with the radially moveable ball detents and locking groove, locking means 26 is provided. Such means is preferably in the form of a sleeve provided with a guiding portion 121 having an internal diameter only slightly greater than the external diameter of the plug portion 23 for sliding movement thereon. The lock sleeve is further provided with a locking portion 122 of larger diameter to permit the wall of the socket portion 17 to be received between its inner surface 124 and the outer surface of the plug portion 23 with a close fit, as shown in Figs. 2 to 5. The front edge of the locking portion 122 preferably is champfered at 125. A radially extending wall 126 between the portions 121 and 122 of the lock sleeve serves as a bearing surface for a spring 128, the other end of the spring being seated against a radially extending wall 130 formed on the body 22. The lock sleeve thus is normally biased to the left, as shown in Fig. 1, and is retained or held in its forwardmost position by means provided by the unlocking means 28.

The unlocking means preferably is in the form of a sleeve surrounding the locking means 26. The unlocking sleeve has a bore 132 to receive therein the portion 50 of the body 16 with a close sliding fit. The unlocking sleeve is also provided with a counterbore 134 of smaller diameter to permit the sleeve to slide with a close fit over the locking portion 122 of the lock sleeve. The outer surface of the unlocking sleeve may be knurled or provided with a raised portion to facilitate grasping and imparting movement thereto. The wall between the bores 132 and 134 is extended radially inward to provide a stop 136 for engagement by the front edge of the lock sleeve and limit its forward movement. The unlocking sleeve is fastened to the coupling member B by means of a pair of oppositely disposed pins 138 which extend through its wall and into an annular groove 140 formed in the body 22. This arrangement allows the unlocking sleeve to be moved axially, with the pins engaging the sides of the groove and actuating as limit stops. If desired, a dust cover 142 may be pivotally and spring mounted on a bracket 144, which in turn is fixedly secured to the front edge of the unlocking sleeve.

Figure 4:
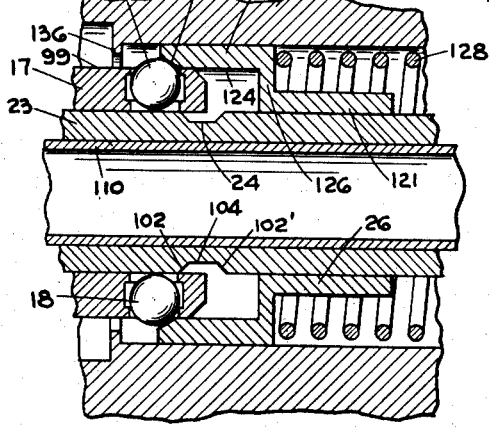
Figs. 4 and 5 are fragmentary, detailed, longitudinal cross-sectional views showing respectively the relationship of the parts just prior to entry of the locking ball detents into the locking groove, and as the detents enter the locking groove.
Figure 5:
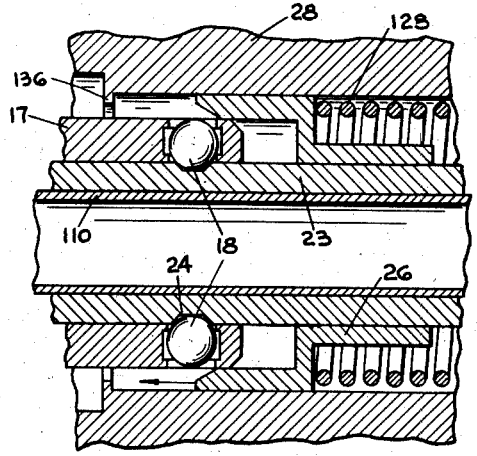

To couple and securely connect the coupling members A and B and to provide for opening of the valves to thereby furnish a line of connection between a source of fluid or gas, such as oxygen, which may be either in liquid or gaseous form, the coupling members are pushed together in an axial direction after raising the dust cover. The coupling member A may be fixed to a bulkhead, whereupon the coupling member B is pushed in the direction of the arrow, as shown in Fig. 1. This may be accomplished by grasping the coupling around the unlocking sleeve 28, by grasping the end fitting 20, or by holding the hose to which the coupling is connected and pushing towards the coupling member A. As shown in Fig. 4, the plug portion 23 when received within the socket portion 17 causes the ball detents 18 to ride on the outer periphery of the plug portion. When the ball detents engage the periphery of the plug portion, they move radially outward beyond the surface 99 of the socket wall, thereby engaging the edge 125 of the lock sleeve 26. Upon further movement of the coupling member B toward the member A, the lock sleeve is further retracted against the force exerted by the spring 128 until, as shown in Fig. 5, the ball detents are in registry with the locking groove 24, whereupon because of the spherical contour of the ball detents, the balls are forced or cammed into the groove 24, clearing the path for the lock sleeve, under the influence of spring 128, to snap back over the ball detents. The forward motion of the lock sleeve is stopped when the front edge thereof engages the stop 136, the unlocking sleeve being held against forward motion by the pins 138 engaging the front side wall defining the annular groove 140. At this point, the coupling members are locked in the condition shown in Fig. 2. It should be noted that, while the champfered edge 125 aids in camming the ball detents into the annular locking groove when the detents and groove are in registry, such champfer may be omitted, because the spherical contour of the ball is itself sufficient to supply a component of force, which will cam the ball detents into the locking groove.

It will be observed that in order to enable the ball detents to register with the locking groove and lock the coupling members together, there must be relative movement between the lock sleeve and the plug body. With the coupling member A held stationary, or moved toward the coupling member B, the described construction permits such relative movement and coupling with one hand grasping the coupling B around its front end, or over the unlocking sleeve, as is most natural. When the forward edge of the locking sleeve engages the ball detents, the locking sleeve is retracted under the held unlocking sleeve until the ball detents and the locking groove are in registry, because the unlocking sleeve is connected to the plug body by the pins 138 as axial pressure is applied. To obtain the relative movement between the locking sleeve and the plug body, it is not necessary to hold and push on the end fitting, or the hose connected thereto, although coupling may also be accomplished in this manner with the structure of the invention.

During the act of coupling, as the ball detents engage the lock sleeve to push it back against the action of its spring, the plug portion 23 enters the opening 72 of the sealing washer, and is sealed by the inwardly inclined lip 70. The end 118 of the shaft insert 110 engages and resiliently presses against the filter 74 causing the filter's stud 76 to push the resiliently pressed valve 10 away from its seat 12. Also, as shown in Fig. 2, the parts are so dimensioned that the end 108 of the plug portion 23 engages the filter to push it to the left until stopped by the wall 60 of the valve seat retainer. The hollow shaft insert 110 is of such length, that by the time coupling is completed and the coupling members are locked together, the valves 10 and 10' are both moved away from their seats against the biasing action of their springs 44, even if the spring associated with one valve is stronger than the other. As seen in Fig. 1, insert 110 protrudes past the end of the plug by a distance greater than the gap between wall 60 and the filter member, which assures this action during coupling.

The coupling members may be very simply and easily disconnected and the valves closed by moving the unlocking sleeve 28 in the direction of the arrow, as shown in Fig. 3. When the unlocking sleeve is thus moved to the right, the depending flange or stop 136 engages the locking sleeve, and pushes it back against the action of the spring 128 until the ball detents 18 are uncovered, whereupon the ball detents move radially outward. Such outward movement of the ball detents is assured, because, as the spring 128 is compressed, a force is exerted against the wall 130 which causes the plug body 22 to move to the right, or in a direction acting to separate the plug and socket bodies. Also, the springs 44 normally act to return the valves towards their respective seats so that a force is transmitted axially against the spring biased shaft insert 110 which acts to separate the coupling members. Thus, with the ball detents no longer confined by the locking sleeve, the detents, aided by the inclined surfaces 102 and 102', will at all times move out of the groove onto the periphery of the plug portion 23. The springs 44 return the valves and the shaft insert 110 to the condition shown in Fig. 1.

If desired, the unlocking sleeve may be retracted to retract the locking sleeve and uncover the locking groove 24 before inserting the plug portion 23 into the socket portion 17. Such movement of the locking sleeve has no effect upon, and will not open, the valve 10'. Both valves are responsive only to the engagement of the shaft insert 110 with the member or filter which bears against the valve 10. The valve thus cannot be opened by retracting the unlocking sleeve while the coupling members are disconnected. The unlocking sleeve extends axially beyond the end 118 of the hollow shaft insert to protect the insert against inadvertently pressing it back to open the valve. The filter 74 is sufficiently hidden to discourage pressing against it to open the valve 10 when the coupling members are disconnected.

It is believed that the advantages of the described coupling structure, of the method of securing a ball detent within a wall, and of the seal between metal surfaces will be apparent from the foregoing detailed disclosure. It will also be apparent that while the invention has been described and illustrated in a preferred form, numerous changes may be made to obtain equivalent structures with the accomplishment of the described improved results, without departing from the spirit or scope of the invention, as sought to be defined in the following claims.

I claim:

1. In a coupling, means for providing a valve seat and a seal between adjacent metal members supporting the valve seat, said means comprising a flexible, deformable plastic element formed with a portion for mating engagement with a valve, said plastic element having a second portion pressed between said metal supporting members, one of said members being formed with a series of concentrically spaced projections and adjacent recesses to provide a plurality of concentric plastic sealing rings within said recesses.

2. In a coupling, means for providing a valve seat and a seal between adjacent annular metal members supporting the valve seat, said means comprising a flexible, deformable plastic element formed with a portion for mating engagement with a valve, said plastic element having a second portion of thin section pressed between said metal supporting members, one of said members being formed with a series of concentrically spaced projections and adjacent recesses, the height of the projections being related to the thickness of said second portion to provide a plurality of separate, concentric plastic sealing rings within said recesses.

3. In a coupling, means for sealing adjacent metal members to prevent leakage of gas or fluid between said members, said means comprising a flexible, deformable plastic element disposed between said metal members, one of said metal members being provided with a series of spaced projections and adjoining recesses, the height of the projections being related to the thickness of the plastic element to provide a plurality of separate, spaced plastic seals within said recesses by the pressure of said metal members on the plastic element.

4. A coupling comprising a socket body and a plug body, a valve mounted in each body for movement in an axial direction, a seat for each of said valves in said bodies, resilient means biasing each valve against its seat, said plug body having an end portion for opening said socket body valve, said plug body having a valve-opening insert slidable therein for opening the valve associated with said plug body, said insert being axially biased by the resilient means associated with said plug body valve and being of a length to extend a predetermined distance beyond the end of that portion of said plug body in which the insert slides, stop means in said socket body for arresting motion of said socket body valve after a predetermined opening motion of said socket body valve, said predetermined opening motion of said socket body valve being less than said predetermined distance by which the plug body insert extends beyond that end portion of the plug body in which the insert slides to insure opening of said socket body valve followed by opening of said plug body valve in the assembled coupling in case the force tending to close the plug body valve exceeds that tending to close the socket body valve, said end portion of said plug body on which said insert slides positively engaging and opening said socket body valve in case the force tending to close the socket body valve exceeds that tending to close the plug body valve, and releasable means to maintain said socket and plug bodies in their assembled, fluid conducting relation.

5. A coupling comprising a socket body and a plug body, a valve mounted in each body, a seat for each valve, resilient means biasing each valve against its seat, said plug body having a valve-opening insert slidable therein and in engagement with the associated valve, said insert being biased by the resilient means associated with said plug body valve and being of a length to extend a predetermined distance beyond the end portion of said plug body in which the insert slides, a socket valve-opening member disposed within said socket body, said socket valve-opening member being biased by the resilient means associated with said socket body valve into engagement with said insert when the bodies are coupled, shoulder means on said socket valve-opening member, stop means on said socket body engageable by the shoulder means of said socket valve-opening member after said member has moved in a direction to open said socket body valve, abutment means on the end portion of said plug body in which said insert slides for engaging said socket valve-opening member, the spacing between said socket body stop means and said shoulder means on said socket valve-opening member being less than said predetermined distance by which the slidable plug body insert extends beyond said abutment means of said plug body to insure opening of both socket and plug body valves in the assembled coupling regardless of the relation of forces tending to close the valves, and releasable means to maintain said socket and plug bodies in their assembled, fluid conducting relation.

6. A coupling comprising a socket body and a plug body, a valve mounted in each body, a seat for each valve, resilient means biasing each valve against its seat, said plug body having a valve-opening insert slidable therein and in engagement with the associated valve, said insert being biased by the resilient means associated with said plug body valve and being of a length to extend a predetermined distance beyond that end portion of said plug body in which the insert slides, a socket valve-opening member disposed within said socket body, said socket valve-opening member being biased by the resilient means associated with said socket body valve into engagement with said insert when the bodies are coupled, shoulder means on said socket valve-opening member, stop means on said socket body engageable by the shoulder means of said socket valve-opening member after said member has moved in a direction to open said socket body valve, abutment means on the end portion of said plug body in which said insert slides for engaging said socket valve-opening member, the spacing between said socket body stop means and said shoulder means on said socket valve-opening member being less than said predetermined distance by which the slidable plug body insert extends beyond said abutment means of said plug body to insure opening of both socket and plug body valves in the assembled coupling regardless of the relation of forces tending to close the valves, and releasable means to maintain said socket and plug bodies in their assembled, fluid conducting relation, said valve-opening member embodying fluid filter means.

7. A coupling comprising a socket body and a plug body, said socket body having a cylindrical wall, a radial bore through the wall, a radially movable ball detent mounted in said bore, the ends of said bore having a reduced diameter portion to prevent the escape of the ball, while allowing the ball to be exposed on either side of the wall, said plug body having an annular locking groove for cooperation with said ball detent, a locking sleeve slidably mounted on said plug body for engagement by said ball detent when said plug body is received in said socket body, therein, resilient means normally biasing said locking sleeve over said locking groove, and locking sleeve unlocking means slidably connected to said plug body, said locking means being formed to engage said locking sleeve for retracting said locking sleeve to a position uncovering said annular locking groove.

8. A coupling comprising a socket body and a plug body, said socket body having a cylindrical wall, a radial bore through the wall, a radially movable ball detent mounted in said bore, the ends of said bore having a diameter less than the diameter of the ball to prevent escape of the ball from the bore, said plug body having an annular locking groove for cooperation with said ball detent, a locking sleeve slidably mounted on said plug body for engagement by said ball detent when said plug body is received in said socket body, resilient means normally biasing said locking sleeve over said locking groove, an unlocking sleeve slidably mounted on said plug body, cooperating shoulder means on said locking and unlocking sleeve for retracting said locking sleeve relative to said plug body to uncover said annular locking groove, and cooperating shoulder means on said unlocking sleeve and on said plug body for withdrawing said plug body from said socket body in response to axial separating force applied to said unlocking sleeve.

References Cited in the file of this patent

UNITED STATES PATENTS

| | | |
|---|---|---|
| 1,867,559 | Beck | July 19, 1932 |
| 1,884,155 | Oestnaes et al. | Oct. 25, 1932 |
| 2,133,916 | Churchill | Oct. 18, 1938 |
| 2,382,975 | Coddington | Aug. 21, 1945 |
| 2,503,495 | Koester | Apr. 11, 1950 |
| 2,674,469 | Earle et al. | Apr. 6, 1954 |
| 2,690,918 | Holte | Oct. 5, 1954 |
| 2,727,759 | Elliott | Dec. 20, 1955 |
| 2,735,696 | Omon et al. | Feb. 21, 1956 |